United States Patent [19]

Consolacion et al.

[11] Patent Number: 5,407,005
[45] Date of Patent: Apr. 18, 1995

[54] TREAD FOR A TIRE

[75] Inventors: Rudy E. Consolacion, Akron; Randall R. Brayer, N. Canton; Warren L. Croyle, Wadsworth, all of Ohio

[73] Assignee: The Goodyear Tire & Rubber Company, Akron, Ohio

[21] Appl. No.: 222,070

[22] Filed: Apr. 4, 1994

[51] Int. Cl.⁶ .......................................... B60C 111/00
[52] U.S. Cl. ................................................ 152/209 A
[58] Field of Search ........... 152/209 R, 209 A, 209 D

[56] References Cited

U.S. PATENT DOCUMENTS

| | | | |
|---|---|---|---|
| 3,799,230 | 3/1974 | Montagne | 152/209 |
| 4,258,769 | 3/1981 | Makino et al. | 152/209 |
| 4,456,046 | 6/1984 | Miller | 152/209 |
| 4,546,808 | 10/1985 | Fontaine et al. | 152/209 |
| 4,823,855 | 4/1989 | Goergen et al. | 152/209 |
| 4,884,607 | 12/1989 | Mori | 152/209 |
| 4,947,911 | 8/1990 | Ushikubo et al. | 152/209 |
| 5,016,838 | 5/1991 | Brooks et al. | 152/209 A |
| 5,048,583 | 9/1991 | Goto et al. | 152/209 |
| 5,078,190 | 1/1992 | Wissbrock et al. | 152/209 |
| 5,105,864 | 4/1992 | Watanabe et al. | 152/209 |
| 5,152,852 | 10/1992 | Hisamichi et al. | 152/209 |
| 5,178,698 | 1/1993 | Shibata | 152/209 |
| 5,293,918 | 3/1994 | Tsuda et al. | 152/209 |

FOREIGN PATENT DOCUMENTS

| | | | |
|---|---|---|---|
| 1159245 | 12/1983 | Canada | 152/209 |
| 0370699 | 5/1990 | European Pat. Off. | 152/209 A |
| 0193704 | 10/1985 | Japan | 152/209 |
| 3-295706 | 12/1991 | Japan | 152/209 |

Primary Examiner—Steven D. Maki
Attorney, Agent, or Firm—David L. King; Roger D. Emerson

[57] ABSTRACT

An asymmetric non-directional tread 12 for a tire 10 is disclosed. The tread 12 has a plurality of ground engaging tread elements 22 separated by circumferential and lateral grooves 24,28. The net contact area in a first tread half 30 is approximately equivalent to a net contact area in a second tread half 32 although the tread stiffness in the first tread half 30 preferably is higher than in the second tread half 32. The outboard side of some circumferential grooves 24 may be tapered to buttress tread elements 22 against cornering forces.

14 Claims, 4 Drawing Sheets

TREAD FOR A TIRE

BACKGROUND OF THE INVENTION

The invention relates to an asymmetrical tread for a pneumatic tire. The tread is specifically designed for use on high performance radial tires.

High performance vehicles require tires capable of performing at high speeds and having good cornering and turning response and good steering and braking responsiveness. Some high performance vehicles are capable of speeds as high as 180 mph. Many tires capable of performing under such conditions provide inadequate performance on wet roadways or those covered with snow or mud.

To meet the needs of these high performance vehicles, especially when these vehicles are to be operated on mud or snow covered roadways, improvements in the current design of high performance tires has been required.

The present invention provides an asymmetrical non-directional tread for a pneumatic tire. The tread is well suited for high performance radial tires, especially those needing to provide good traction on wet roadways or those covered with mud or snow.

SUMMARY OF THE INVENTION

This invention relates to an asymmetric tread for a tire wherein the tread, when configured annularly, has an axis of rotation, a tread width, first and second lateral edges and an equatorial plane EP centered between the edges, a first tread half extending from the first lateral edge to the equatorial plane EP and a second tread half extending from the second lateral edge to the equatorial plane EP. The tread comprises a plurality of ground engaging tread elements separated by a plurality of circumferentially continuous grooves and a plurality of laterally extending grooves. The tread elements in the first tread half have a net contact area substantially equal to the net contact area of the tread elements of the second tread half as measured around the entire circumference of the tread. The circumferential and lateral grooves each have an average groove width as measured between the ground contacting surface of the tread elements. The total of the average groove widths of the circumferential grooves of the first tread half is greater than the total of the average groove widths of the circumferential grooves of the second tread half. The total of the average groove width of the lateral grooves of the first tread half are less than the total of average groove width of the lateral groove widths of the second tread half.

Definitions

"Axial" and "axially" are used herein to refer to lines or directions that are parallel to the axis of rotation of the tire.

"Circumferential" means lines or directions extending along the perimeter of the surface of the annular tread perpendicular to the axial direction.

"Radial" and "radially" are used to mean directions radially toward or away from the axis of rotation of the tire.

"Lateral" means an axial direction.

"Aspect ratio" of a tire means the ratio of the section height to the section width.

"Footprint" means the contact patch or area of contact of the tire tread with a flat surface at zero speed and under normal load and pressure, including the area occupied by grooves as well as the tread elements.

"High Performance" means tires having an aspect ratio of 70 or less and a nominal rim diameter of 19 inches or less.

"Net contact area" means the total area of ground contacting tread elements within the footprint divided by the gross area of the footprint.

"Groove" means an elongated void area in a tread that may extend circumferentially or laterally about the tread in a straight, curved, or zig-zag manner. Circumferentially and laterally extending grooves sometimes have common portions and may be subclassified as "wide", "intermediate width", "narrow", or "slot." The slot typically is formed by steel blades inserted into a cast or machined mold or tread ring therefor. The "groove width" is equal to tread surface area occupied by a groove or groove portion, the width of which is in question, divided by the length of such groove or groove portion; thus, the groove width is its average width over its length. Grooves, as well as other voids, reduce the stiffness of the tread regions in which they are located. Slots often are used for this purpose, as are laterally extending narrow or width grooves. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Sipe" means small slots molded into the tread elements of the tire that subdivided the tread surface and improves traction.

"Inboard side" as used herein means the side of the tire nearest the vehicle when the tire is mounted on a wheel and the wheel is mounted on the vehicle.

"Outboard side" as used herein means the side of the tire farthest away from the vehicle when the tire is mounted on a wheel and the wheel is mounted on the vehicle.

"Rib" means a circumferentially extending strip of rubber on the tread which is defined by at least one circumferential groove and either a second such groove or a lateral edge, the strip being laterally undivided by full-depth grooves.

"Tread Element" means a rib or a block element.

"Equatorial plane (EP)" means the plane perpendicular to the tire's axis of rotation and passing through the center of its tread.

DETAILED DESCRIPTION OF THE INVENTION

Figure 1:
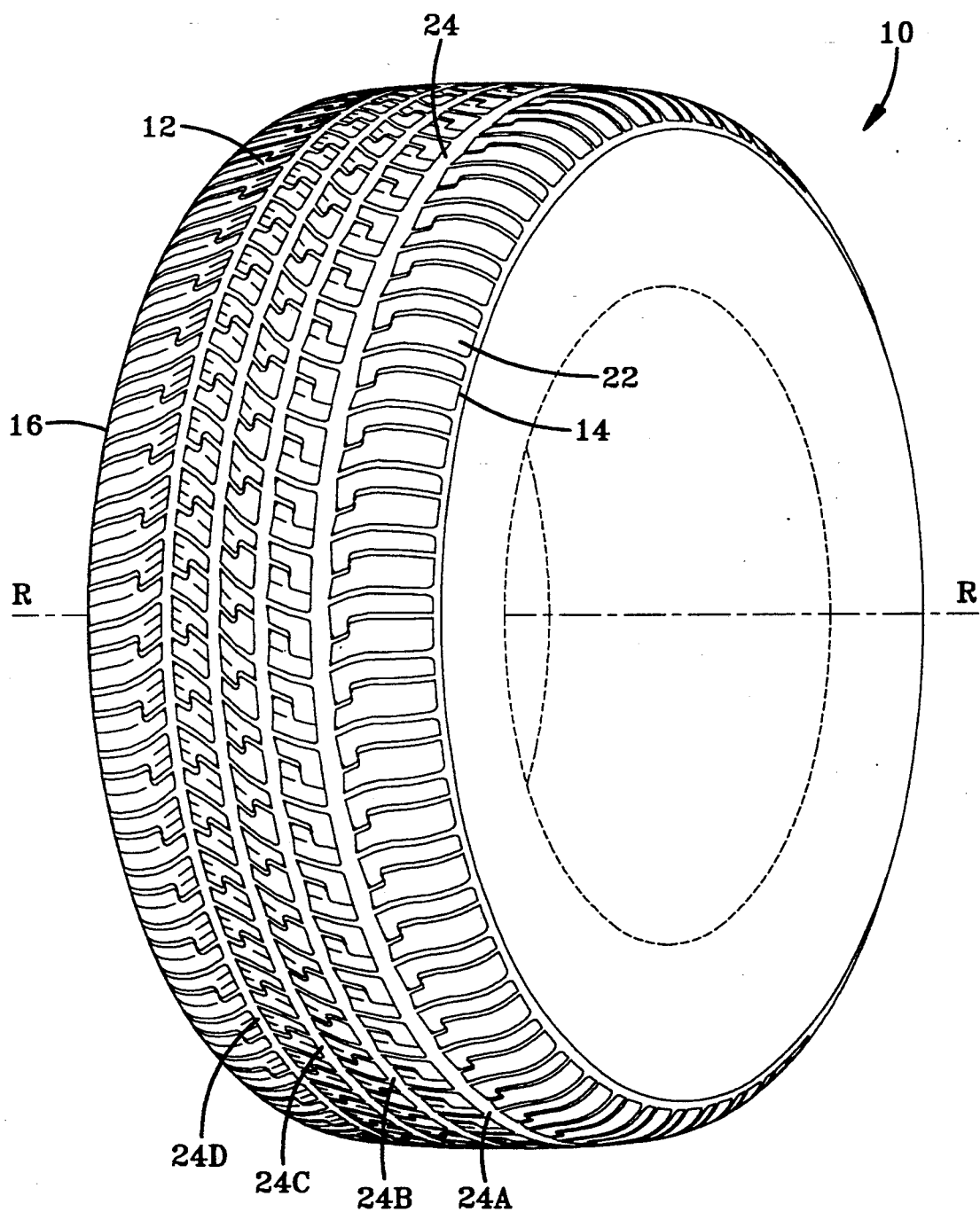
FIG. 1 is a perspective view of a tread according to the present invention annularly attached to a tire.
Figure 2:
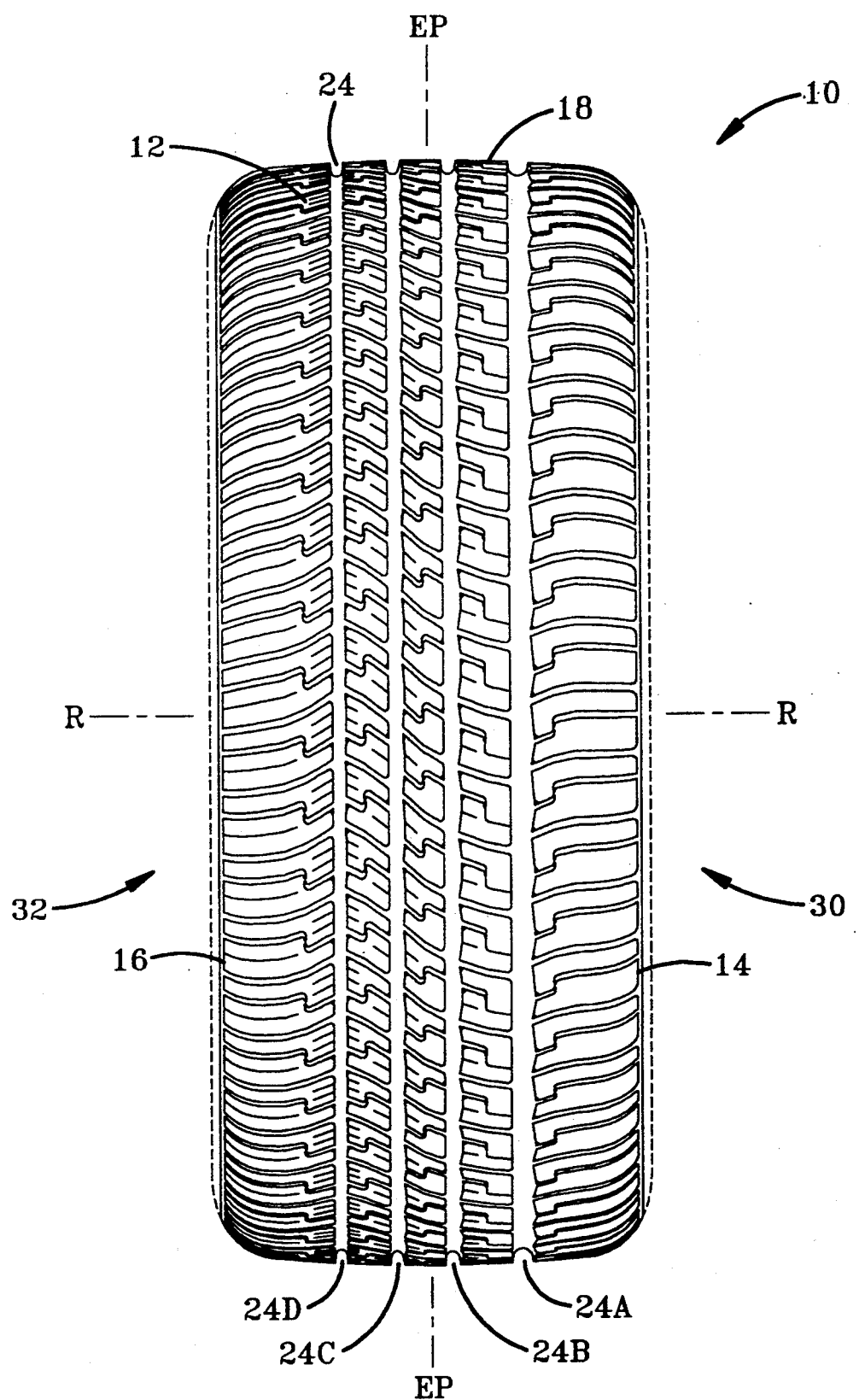
FIG. 2 is a front view of the tread illustrated in FIG. 1.

With reference to FIGS. 1-4, a tread 12 according to the present invention is illustrated. The tread 12 is annularly attached to a tire 10. The tread 12 as illustrated is asymmetric and non-directional.

An asymmetric tread is a tread that has a tread pattern not symmetrical about the centerplane or equatorial plane EP of the tire.

A non-directional tread is a tread that has no preferred direction of forward travel and is not required to be positioned on a vehicle in a specific wheel position or positions to ensure that the tread pattern is aligned with the preferred direction of travel.

The conventional passenger tire also has a tread pattern that is symmetrical relative to the centerplane of the tread. This allows the tire to be mounted on either side of the vehicle regardless of the direction of travel. This symmetry of design does not take in account that design loads and requirements might be different at different tire locations on the vehicle.

The use of a tire with asymmetric tread means that there are tires designed to be mounted on the left side of the vehicle and there are tires designed to be mounted on the right side of the vehicle. This means each tire tread design can be optimized to accommodate the requirements of the vehicle on either side of the vehicle. The design of the tire tread may vary across the width of the tread so that capabilities of the different regions of the tread width may be varied to enhance tire performance.

The tread 12 illustrated in FIGS. 1-4 is one example of a asymmetric and non-directional tread design according to the present invention.

The tread 12, when configured annularly, has an axis of rotation R, first and second lateral edges 14,16 a central portion 18 therebetween. The first lateral edge 14 is toward the outside or outboard side of the vehicle while the second lateral edge 16 is designed to be mounted inboard or toward the inside of the vehicle.

The tread 12 has a plurality of ground engaging tread elements 22 separated by circumferential grooves 24 and lateral grooves 28. The lateral grooves 28 may intersect and join to form a continuous lateral groove path across the entire tread width. Alternatively the lateral grooves 28 may be laterally or circumferentially spaced and never connecting, or may meet at a groove.

The tread 12 as illustrated in FIGS. 1-4 has a net contact area of 65% measured from tread lateral edge to tread lateral edge. It is believed that the invention can be successfully practiced with treads having net contact areas between 62% and 68%.

The tread 12 is divided laterally into a first tread half 30 and a second tread half 32. The first tread half 30 is located between the first lateral edge 14 and the tire's equatorial plane EP. The second tread half 32 extends from the second lateral edge 16 to the equatorial plane EP.

The outer or first tread half 30 is intended to be mounted on the outer or outboard side of the vehicle (not shown). While the first tread half 30 has an equivalent net contact area to the second tread half 32, the first tread half 30 has a higher circumferential and lateral tread stiffness than the second tread half 32. In the preferred embodiment, the average lateral tread stiffness of the first tread half 30 is 2267 lb/in while the average lateral tread stiffness of the second tread half 32 is 1169 lb/in. Further, in the preferred embodiment, the average circumferential tread stiffness of the first tread half 30 is 1709 lb/in while the average tread stiffness of the second tread half 32 is 1169 lb/in. Therefore, the average tread stiffness of the first tread half 30 is approximately 70% higher than the average tread stiffness of the second tread half 32. It is believed the invention is best practiced when the stiffness of the first tread half 30 is between 50% and 100% higher than the average tread stiffness of the second tread half 32. The higher tread stiffness in the first tread half 30 should provide excellent tread wear and traction while the lower tread stiffness in the inboard or second tread half 32 provides excellent wet, snow and mud traction.

Figure 3:
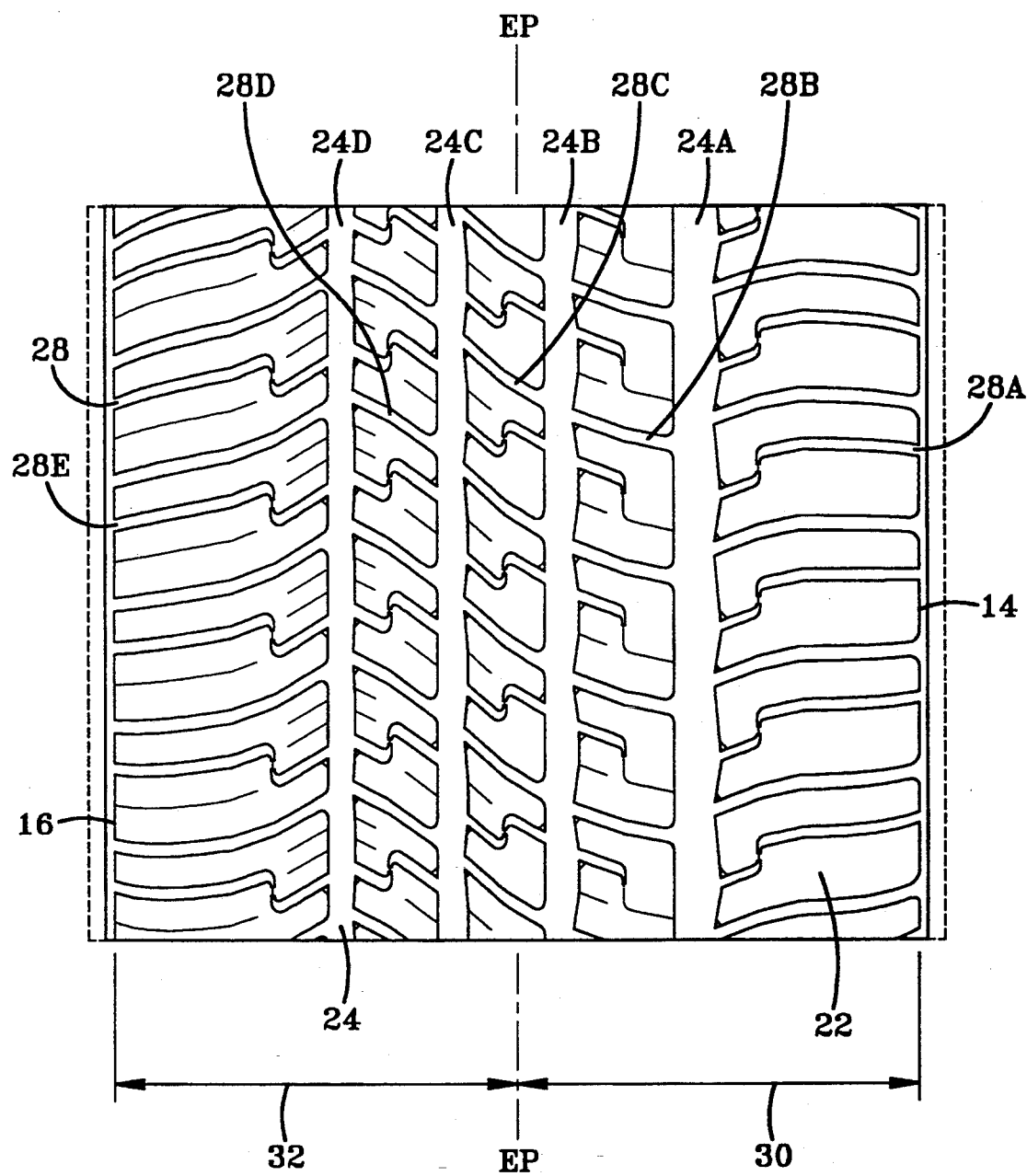
FIG. 3 is a plan view of a portion of the tread illustrated in FIGS. 1 and 2.

With reference to the Figures, especially FIG. 3, one of the important features of the preferred embodiment inventive tire 10 is the fact that the net contact area is constant in the first tread half 30 and the second tread half 32 even though the tread stiffness in the first tread half 30 is higher than the second tread half 32. This is accomplished by progressively narrowing the circumferential groove widths 24 from the first lateral edge 14 of the tread 12 to the second lateral edge 16 of the tread 12. For example, with reference to FIG. 3, the four circumferential grooves 24 are designated 24A,24B,24C,24D. Circumferential groove 24A is the closest to the first lateral edge 14 and is the widest circumferential grooves. The next circumferential groove 24B is slightly narrower than circumferential groove 24A. The next circumferential groove moving inwardly toward the second lateral edge 16 of the tread 12 is circumferential groove 24C, and it is narrower yet. The narrowest circumferential groove 24D is the circumferential groove nearest the second lateral edge 16 of the tread 12.

Similarly, but in the opposite direction, the average width of the lateral grooves 28 increases when moving from the first lateral edge 14 of the tread 12 to the second lateral edge 16 of the tread 12. For example, the lateral groove closest to the first lateral edge 14 of the tread 12 is lateral groove 28A. Lateral groove 28A is narrower than the other lateral grooves. The next lateral groove, moving toward the second lateral edge 16 of the tread 12, is lateral groove 28B which is wider than lateral groove 28A. Similarly, continuing to move laterally across the tread width toward the second lateral edge 16 of the tread 12, the next lateral groove is 28C which is wider yet than lateral groove 28B. The process continues until the widest lateral grooves 28E are reached.

Figure 4:
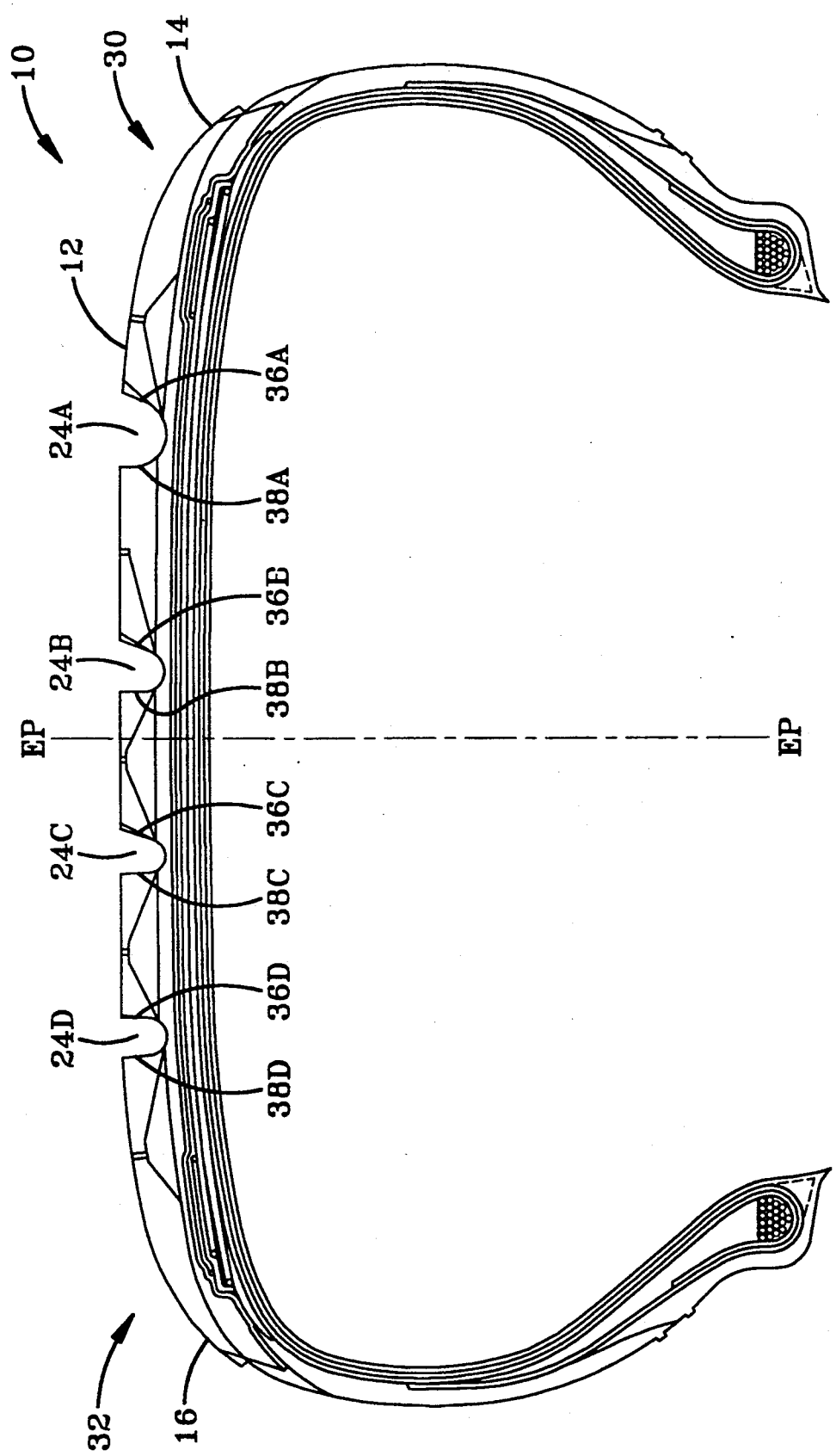
FIG. 4 is a cross-sectional view of a tire taken along a plane passing through the tire's axis of rotation, the tire incorporating a tread according to the invention.

With reference to FIG. 4, another important feature of the tread 12 will be illustrated. The four circumferential grooves 24A,24B,24C,24D are illustrated. The progressive increase in width from the second lateral edge 16 to the first lateral edge 14 is evident. It is also evident that the outboard side 36 of some of the circumferential grooves 24 is tapered. For example, with reference to circumferential groove 24D, both the inboard side 38D and the outboard side 36D of the groove 24D have the same degree of taper. In contrast, the outboard sides 36A,36B,36C of circumferential grooves 24A,24B,24C have a different taper than the inboard sides 38A,38B,38C of the same grooves. The outboard side 36 of the three outboard most circumferential grooves 24A,24B,24C have a taper between 12° and 25° while the inboard sides 38 of the same grooves 24A,24B,24C have a taper between 0° and 10°. The preferred embodiment, the taper of the outboard side 36A,36B,36C of the three outboardmost circumferential grooves 24A,24B,24C makes an angle of 20° with a plane (not shown) parallel to the equatorial plane EP of the tire 10 while the inboard side 38A,38B,38C of the same grooves 24A,24B,24C makes an angle of 0° with a plane parallel to the equatorial plane EP of the tire 10. In a preferred embodiment, both the outboard side 36D and the inboard side 38D of the inboardmost circumferential groove 24D make an angle of 12° with a plane parallel to the equatorial plane EP of the tire 10. The function of the tapered sidewalls 36A,36B,36C of circumferential grooves 24A,24B,24C is to buttress the tread elements 22 against the cornering forces generated by and placed upon the tread elements 22 near the first lateral edge 14 of the tire 10.

Experimental tests under a variety of conditions were conducted with tires made according to the present invention. Commercially available tires of the same size designation as the test tires were used as a control tire. Comparisons of the inventive tires and the control tires were made under identical test conditions. The tires were used on the same vehicle for each particular trial. The tire size utilized for the test was P195/60R15. The vehicle used for all tests was a 1991 Chevrolet Camaro.

A summary of the test results revealed the inventive tire outperformed the control tire in a variety of tests.

A test measuring a tire's tendency to hydroplane was performed. In the test, a glass plate imbedded in a road is covered with 2 mm (0.080) of water-based dye. The test tire passes over the plate at varying speeds and is photographed from below. Two photos are taken of each tire at each speed with one tire of each construction being tested. Each tire at varying speeds is compared with its own 2 mph run. No hydroplaning is considered to occur at this speed. In the hydroplaning test, the inventive tire retained 72% of contact area through 80 mph at 0.080 water depth while the control tire retained 56% of its contact area under the same conditions.

The inventive tire was also tested for subjective noise performance. In this test, the inventive tire had less tread noise and less braking growl than the control tire.

The inventive tire also showed improvements in various handling and ride measurements. When tested for subjective harshness, the inventive tire outperformed the control tire in initial impact and impact damping qualities. The inventive tire was slightly better than the control in braking shudder and significantly better in a subjective handling evaluation, especially in steering response, response linearity and evasive maneuvering. The inventive tire was very good for steering response, having less oversteer and power on understeer than the control tire.

It is believed that the novel features disclosed above can be easily applied to directional tread patterns as well. Although the preferred embodiment discloses a progressive narrowing or widening of groove to maintain a constant net contact ratio substantially constant from the first half to the second half it is not required that either the lateral or the circumferential grooves progressively change widths as a function of axial distance from a lateral edge. The constant contact area simply can be achieved by adding more circumferential grooves on one tread half with a corresponding increase in lateral grooves on the opposite tread half. Alternatively any variation in average groove widths that ensures that total average groove widths of the circumferential grooves of the first tread half is greater the total average groove widths of the circumferential grooves of the second half and that the total average lateral groove widths of the second half is correspondingly greater than the total average lateral groove widths of the first half while achieving substantially equal net contact areas between the two half of a asymmetric tread is considered within the scope of the invention. While certain representative embodiments and details have been shown for the purpose of illustrating the invention, it will be apparent to those skilled in the art that various changes and modifications can be made therein without departing from the scope of the invention.

It is claimed:

1. An asymmetric tread for a tire wherein the tread, when configured angularly, has an axis of rotation, a tread width TW, first and second lateral edges and an equatorial plane centered between the edges, a first tread half extending from the first lateral edge to the equatorial plane and a second tread half extending from the second lateral edge to the equatorial plane, the tread comprising a plurality of ground engaging tread elements separated by a plurality of circumferentially continuous grooves and a plurality of laterally extending grooves wherein the tread elements in the first tread half have a net contact area substantially equal to the net contact area of the tread elements of the second tread half as measured around the entire circumference of the tread and wherein the circumferential and lateral grooves each have an average groove width as measured between the ground contacting surface of the tread elements, the total of the average groove widths of the circumferential grooves of the first tread half being greater than the total of the average groove widths of the circumferential grooves of the second tread half and wherein the total of the average groove widths of the lateral grooves of the first tread half are less than the total of the average groove widths of the lateral groove widths of the second tread half and wherein the circumferential grooves are progressively narrower in average groove width from the first lateral edge to the second lateral edge.

2. The asymmetric tread of claim 1 wherein the lateral grooves progressively widen in average groove width from the first lateral edge to the second lateral edge.

3. The asymmetric tread of claim 2 wherein the tread elements adjacent the first lateral edge have a lateral stiffness greater than the lateral stiffness of the tread elements adjacent the second lateral edge.

4. The asymmetric tread of claim 1 wherein the tread adjacent the first lateral edge has a lateral stiffness greater than the lateral stiffness of the tread adjacent the second lateral edge.

5. The asymmetric tread of claim 1 wherein the tread elements adjacent the first lateral edge have a circumferential stiffness greater than the circumferential stiffness of the tread elements adjacent the second lateral edge.

6. The asymmetric tread of claim 1 wherein the tread adjacent the first lateral edge has a circumferential stiffness greater than the circumferential stiffness of the tread adjacent the second lateral edge.

7. The asymmetric tread of claim 1 wherein at least one side of one of the circumferential grooves is tapered.

8. The asymmetric tread of claim 7 wherein the axially outer side of the one of the circumferential grooves is tapered relative to a plane parallel to the equatorial plane and the axially inner side of the one of the circumferential grooves is not tapered relative to a plane parallel to the equatorial plane.

9. The asymmetric tread of claim 7 wherein the axially outer sides of the circumferential grooves in the first half of the tread are tapered relative to a plane parallel to the equatorial plane more than the axially outer sides of the circumferential grooves in the second half of the tread.

10. The asymmetric tread of claim 9 wherein the axially outer sides of three circumferential grooves closest to the first lateral edge of the tread are tapered relative to a plane parallel to the equatorial plane more than other circumferential grooves in the tread.

11. The asymmetric tread of claim 7 wherein the tread comprises four circumferential grooves each having an axially outer and axially inner side, the axially outer sides of the three axially outermost grooves relative to the first lateral edge having a taper between 12° and 25° relative to a plane parallel to the equatorial plane and the axially inner sides of the three axially outermost grooves having a taper between 0° and 10° relative to a plane parallel to the equatorial plane.

12. The asymmetric tread of claim 11 wherein the axially inner sides of the three axially outermost grooves relative to the first lateral edge having a taper of 0° relative to a plane parallel to the equatorial plane.

13. The asymmetric tread of claim 11 wherein the inner and outer sides of the axially innermost groove nearest the first lateral edge have a taper of between 5° and 15° relative to a plane parallel to the equatorial plane.

14. An asymmetric tread for a tire wherein the tread, when configured angularly, has an axis of rotation, a tread width TW, first and second lateral edges and an equatorial plane centered between the edges, a first tread half extending from the second lateral edge to the equatorial plane, the tread comprising a plurality of ground engaging tread elements separated by a plurality of circumferentially continuous grooves and a plurality of laterally extending grooves wherein the tread elements in the first tread half have a net contact area substantially equal to the net contact area of the tread elements of the second tread half as measured around the entire circumference of the tread and wherein the circumferential and lateral grooves each have an average groove width as measured between the ground contacting surface of the tread elements, the total of the average groove widths of the circumferential grooves of the first tread half being greater than the total of the average groove widths of the circumferential grooves of the second tread half and wherein the total of the average groove widths of the lateral grooves of the first tread half are less than the total of the average groove widths of the lateral groove widths of the second tread half and wherein the lateral grooves are progressively wider in average groove width from the rest lateral edge to the second lateral edge.

* * * * *

UNITED STATES PATENT AND TRADEMARK OFFICE
CERTIFICATE OF CORRECTION

PATENT NO. : 5,407,005
DATED : April 18, 1995
INVENTOR(S) : Consolacion et al.

It is certified that error appears in the above-identified patent and that said Letters Patent is hereby corrected as shown below:

Column 6, line 16, "angularly" should be -- annularly --.

Column 8, line 5, "angularly" should be -- annularly --.

Signed and Sealed this

Third Day of October, 1995

Attest:

BRUCE LEHMAN

Attesting Officer     Commissioner of Patents and Trademarks